US009148572B2

(12) United States Patent
Kitano et al.

(10) Patent No.: US 9,148,572 B2
(45) Date of Patent: Sep. 29, 2015

(54) TIMING GENERATOR, IMAGING DEVICE, AND DOT-CLOCK OUTPUT METHOD

(75) Inventors: Masahiro Kitano, Kanagawa (JP);
Ryuichi Shiohara, Nagano (JP);
Toshiyuki Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 702 days.

(21) Appl. No.: 13/271,543

(22) Filed: Oct. 12, 2011

(65) Prior Publication Data

US 2012/0092542 A1 Apr. 19, 2012

(30) Foreign Application Priority Data

Oct. 13, 2010 (JP) ................................. 2010-230298

(51) Int. Cl.
*H04N 5/232* (2006.01)
*H04N 5/376* (2011.01)
*H04N 5/77* (2006.01)
*H04N 9/804* (2006.01)

(52) U.S. Cl.
CPC ......... *H04N 5/23293* (2013.01); *H04N 5/3765* (2013.01); *H04N 5/772* (2013.01); *H04N 9/8042* (2013.01)

(58) Field of Classification Search
CPC . H04N 5/23293; H04N 5/3765; H04N 5/772; H04N 9/8042
See application file for complete search history.

(56) References Cited

U.S. PATENT DOCUMENTS

| 7,710,468 B2 | 5/2010 | Uchida et al. | |
|---|---|---|---|
| 2003/0011588 A1 | 1/2003 | Kim | |
| 2003/0156639 A1 | 8/2003 | Liang | |
| 2003/0193461 A1* | 10/2003 | Katagawa | 345/87 |
| 2006/0202981 A1* | 9/2006 | Kuo et al. | 345/213 |
| 2007/0269192 A1* | 11/2007 | Sato | 386/126 |
| 2010/0079441 A1* | 4/2010 | Sasaki et al. | 345/213 |

FOREIGN PATENT DOCUMENTS

| JP | 09-297555 A | 11/1997 |
|---|---|---|
| JP | 2007-243615 A | 9/2007 |
| JP | 2007-295096 A | 11/2007 |

OTHER PUBLICATIONS

Extended European Search Report dated Aug. 10, 2012 for the counterpart European Patent Application No. 11184915.4.

* cited by examiner

*Primary Examiner* — Luong T Nguyen
(74) *Attorney, Agent, or Firm* — Global IP Counselors, LLP

(57) ABSTRACT

A timing generator includes a frame rate information receiver, a display control section, and a determination unit. The frame rate information acquisition section is configured to receive information indicating a frame rate of an image sensor. The display control section is configured to output dot clocks in a first cycle to a display which includes a counter being configured to count the number of the dot clocks for a synchronization period, where the dot clocks are a synchronization signal. The determination unit is configured to determine whether or not the number of the dot clocks in the synchronization period is expected to exceed a predetermined number, where length of the synchronization period is based on at least the frame rate of the image sensor. The display control section is configured to switch from the first cycle to a second cycle, if the number of dot clocks is expected to exceed the predetermined number.

8 Claims, 7 Drawing Sheets

TIMING GENERATOR, IMAGING DEVICE, AND DOT-CLOCK OUTPUT METHOD

CROSS-REFERENCE TO RELATED APPLICATIONS

This application claims priority to Japanese Patent Application No. 2010-230298 filed on Oct. 13, 2010. The entire disclosure of Japanese Patent Application No. 2010-230298 is hereby incorporated herein by reference.

BACKGROUND

1. Technical Field

The present invention is related to a timing generator for displaying an image of an object on a display, an imaging device provided with the timing generator and adapted to display an image of an object on a display, and a dot clock output method.

2. Background Technology

There are well-known imaging devices in which an image captured by an imaging sensor is displayed on a liquid crystal display, and various types of techniques have been developed in order to prevent the image of an object displayed on a liquid crystal display from being displayed with a delay relative to the object. For example, in patent document 1, a technique is disclosed in which an imaging device provided with a VRAM for recording an image signal in a single frame reads the image signal and displays the image signal on the liquid crystal display before the image signal in the single frame has finished being written into the VRAM. Specifically, a configuration is described in which an image begins to be displayed on the liquid crystal display with a playback timing that is delayed by $\Delta T$ from the drive timing of the imaging sensor.

Japanese Patent Application Publication No. 2007-243615 (patent document 1) is an example of the related art.

SUMMARY

In the technique of patent document 1, the period of the drive timing and the playback timing is a period for processing the image of a frame, and a fixed $\Delta T$ is defined for each frame. In other words, it is indicated in relation to the technique of patent document 1 (patent document 1, paragraph 0057) that $\Delta T$ is defined for each mode and that $\Delta T$ is determined so that the reading of the image data does not take place before the writing of the data (patent document 1, paragraphs 0055, 0056). Accordingly, although it can vary for each mode, $\Delta T$ has a common value for each frame within a single mode, and the common phase difference $\Delta T$ is given for all the lines of the image to be displayed.

However, the time period required for various video processes varies for each line in an arrangement in which images are processed in order to display the image of an object on a liquid crystal display on the basis of the output data of an imaging sensor. In the case of an arrangement in which the time period required to for various video processes varies for each line, it is possible that on a certain line, for example, the image data is read before being written when the common phase difference $\Delta T$ is assigned to all the lines of the image to be displayed. It is also possible that a delay can occur during writing after reading is performed on another line. Accordingly, display efficiency is believed to decline when a line-common phase difference $\Delta T$ is assigned in the cases of such an arrangement. An object of the invention is to improve the display efficiency in light of the above problem.

A timing generator of an imaging device is provided. The timing generator includes a frame rate information receiver, a display control section, and a determination unit.

The frame rate information acquisition section is configured to receive information indicating a frame rate of an image sensor for capturing an image of an object, where the image sensor is configured to output image data indicating the image. The display control section is configured to output dot clocks in a first cycle to a display which includes a counter being configured to count the number of the dot clocks being output for a synchronization period which is a display cycle for a display line, where the dot clocks are a synchronization signal being used when the image is displayed on the display. The determination unit is configured to determine whether or not the number of the dot clocks in the synchronization period is expected to exceed a predetermined number, where length of the synchronization period being based on at least the frame rate of the image sensor. The display control section is configured to switch from the first cycle to a second cycle, which is longer than the first cycle, if the number of dot clocks in the synchronization period is expected to exceed the predetermined number.

BRIEF DESCRIPTION OF THE DRAWINGS

Referring now to the attached drawings which form a part of this original disclosure.

DETAILED DESCRIPTION OF EXEMPLARY EMBODIMENTS

The embodiments of the invention are described according to the sequence below.

(1) Imaging device structure
(2) Control of the horizontal synchronization signal
(3) Other embodiments

(1) Imaging Device Structure

Figure 1:
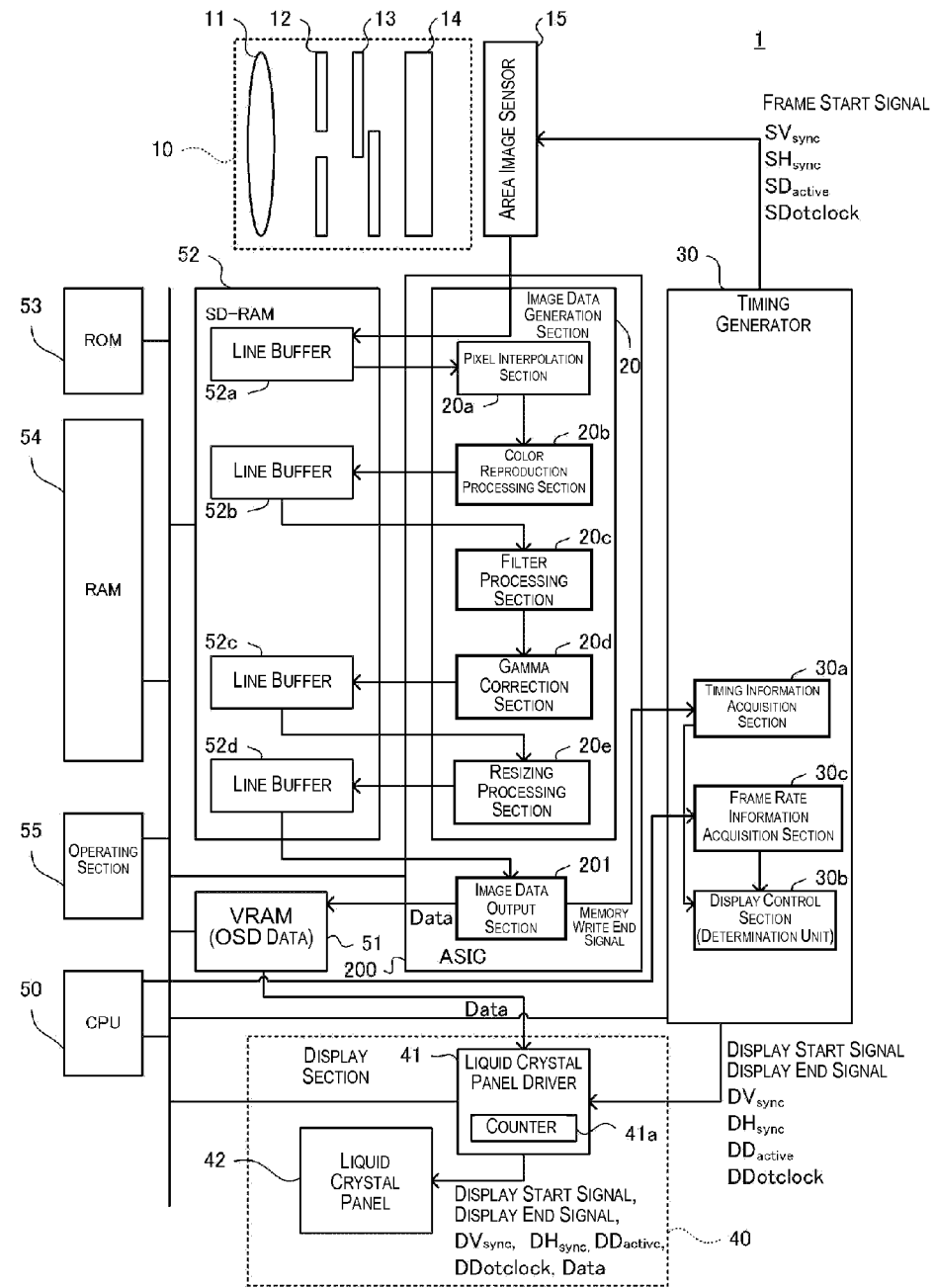
FIG. 1 is a block diagram pertaining to an embodiment of the invention.

In FIG. 1, an imaging device 1 pertaining to an embodiment of the invention is shown as being provided with an optical system 10, an area image sensor 15, ASIC 200, a timing generator 30, a display 40, a CPU 50, a VRAM 51, an SD-RAM 52, a ROM 53, a RAM 54, and an operating unit 55. The CPU 50 can perform a program recorded on the ROM 53 by appropriately using the VRAM 51, SD-RAM 52, and RAM 54. According to the program, the CPU 50 generates image data for indicating an object captured by the area imaging sensor 15 according to the operation in the operating unit 55. The operating unit 55 is provided with a shutter button, a dial switch as a mode-switching means for switching modes, a dial switch for switching aperture and shutter speed, and a pushbutton for operating various types of settings menus. A user can provide various instructions to the imaging device 1 by operating the operating unit 55.

The display 40 is an EVF (Electronic View Finder) for displaying video indicating the object to be captured and allowing the user to gain an understanding of the state of the object, the imaging conditions, and other information prior to capturing the image. The imaging device 1 pertaining to an embodiment of the invention is a mirrorless digital camera provided with the EVF. The display 40 is provided with an interface circuit (not shown), a liquid crystal panel driver 41, a counter 41a, a liquid crystal panel 42, an ocular lens (not shown), and other components. In the present embodiment, the liquid crystal panel 42 is a high-temperature polysilicon TFT (Thin Film Transistor) provided with three sub-pixels that correspond to three color filters for each pixel. The location of the pixels is prescribed by coordinates in the Cartesian coordinate system. In addition, a line is configured by a plurality of pixels lined up together in a direction parallel to one coordinate axis, and a plurality of lines is configured to line up together in a direction parallel to the other axis. As used herein, lines in a parallel direction are called horizontal lines, lines in a vertical direction are called vertical lines, and a picture configured from all of the pixels on a liquid crystal panel 42 is called a frame.

The liquid crystal panel driver 41 applies voltage to each sub-pixel and outputs a signal for driving the liquid crystal to the liquid crystal panel 42. The liquid crystal panel 42 is provided with a gate driver and a source driver (not shown). The gate driver controls the display timing in each pixel of each line according to the signal output from the liquid crystal panel driver 41. The source driver displays images by applying a voltage that corresponds to the image data for each pixel to each pixel of the line assumed to have the display timing. In other words, the liquid crystal panel driver 41 is configured to output various signals for displaying images on the liquid crystal panel 42, for example, a display start signal for prescribing the timing for starting the display in a single frame, a display end signal for indicating that the display in a single frame is completed, a vertical synchronization signal for prescribing the time period for displaying a single frame (DVsync), a horizontal synchronization signal for prescribing the time period for displaying a line (DHsync), a data active signal for prescribing the time period for importing image data within each line (DDactive), and a dot-clock signal for prescribing the timing and other information for importing image data for each pixel (DDotclock), that is, image data (Data) for each pixel.

Figure 8:
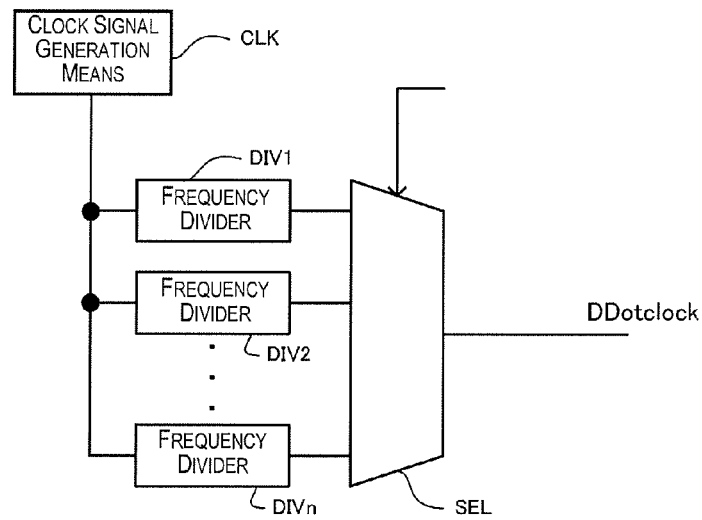
FIG. 8 is a block diagram showing a clock division circuit pertaining to an embodiment of the invention.

The imaging device 1 pertaining to the present embodiment is provided with a timing generator 30. The above-mentioned vertical synchronization signal DVsync, horizontal synchronization signal DHsync, data active signal DDactive, dot-clock signal DDotclock, display start signal, and display end signal are generated by the timing generator 30. In other words, the timing generator 30 is provided with a display control section 30b provided with a clock division circuit or the like for generating signals whose signal level changes in synchronization with the changing timing of the fixed-cycle clock signal output from clock signal generation means. The timing generator 30 generates a vertical synchronization signal DVsync, a data active signal DDactive, a dot-clock signal DDotclock, a display start signal, and a display end signal, of which signal level is changed at a predetermined timing according to the control of the display control section 30b. In the present embodiment, the dot-clock DDotclock cycle is variable. FIG. 8 is a block diagram showing a specific arrangement of a clock division circuit for generating dot-clocks having multiple types of cycles. The clock division circuit is provided with a plurality of frequency dividers DIV1 to DIVn for dividing, at a plurality of division ratios, clock signals output from the clock signal generation means CLK, and a selector SEL for switching the frequency dividers that generate signals to be output. The display control section 30b switches the dot-clock DDotclock cycle output to the display 40 by switching the selection of the frequency dividers by the selector SEL. In the present embodiment, the output timing of the horizontal synchronization signal DHsync is variable and the output timing is determined depending on the processing outcome of image data output section 201, as described below.

The liquid crystal panel driver 41 is provided with a counter 41a for counting, for each cycle of a horizontal synchronization signal DHsync, the number of outputs of the dot-clock signal DDotclock output from the timing generator 30 controlled by the display control section 30b. The output number of dot clocks counted by the counter 41a is used for controlling the display timing in the display 40. Specifically, the display 40 counts the output number of dot clocks for each horizontal synchronization period to allow N pixels to be displayed together every time N dot clocks are output (where N is a natural number). The maximum value Cdd_MAX of the counter 41a is determined in advance depending on the display 40. An overflow occurs in the counter 41a and the display 40 malfunctions when a higher number of dot clocks than the maximum value Cdd_MAX is generated by the display control section 30b within one horizontal synchronization period.

In addition, the liquid crystal panel 42 in the present embodiment is a panel that has an XGA pixel count and is provided with 1024 effective pixels in the horizontal direction and 768 effective pixels in the vertical direction. A tone that corresponds to the image data Data can be displayed in any location by adjusting the content and output timing of Data that is output by the liquid crystal panel driver 41. In the present embodiment, an arrangement is adopted in which a video of the object is displayed based on the output data of the area image sensor 15 in the predetermined subject image display area of the liquid crystal panel 42, and characters for indicating the imaging conditions and other information are displayed on an information display area outside of the object display area. In other words, characters for indicating the imaging conditions and other information are displayed together with the video of an object in an OSD (On Screen Display) mode on the liquid crystal panel 42. The liquid crystal panel 42 is provided with a higher number of pixels than the effective pixels in the horizontal direction and vertical direction, but a description is given herein that, for simplicity, omits processes related to pixels other than effective pixels.

The optical system 10 is provided with a lens 11 for allowing an image of an object to be formed in the area image sensor 15, an aperture 12, a shutter 13, and a low-pass filter 14. Among these, the lens 11 and the aperture 12 are replaceably installed in a casing (not shown). A CMOS (Complementary Metal Oxide Semiconductor) image sensor provided with a Bayer-array color filter, as well as a plurality of photodiodes in which a charge that corresponds to the quantity of light is recorded for each pixel by photoelectric conversion, a CCD (Charged Coupled Device) image sensor, and other solid-state imaging elements are used as the area image sensor 15. The location of pixels in the area image sensor 15 is prescribed by coordinates in the Cartesian coordinate system. Lines are configured by multiple pixels lined up together in a direction parallel to one coordinate axis, and a plurality of lines is arranged to line up together in a direction parallel to the other axis. As used herein, a direction parallel to a line is called the horizontal direction, a direction perpendicular to a line is called the vertical direction, and a picture configured from all of the pixels on the area image sensor 15 is called a frame.

In the present embodiment, the area image sensor 15 also operates in synchronization with various signals output by the timing generator 30. In other words, the timing generator 30 outputs a frame start signal for prescribing the timing to start processing for a single frame, a vertical synchronization signal (SVsync) for prescribing the time period for reading the detection result of the photodiodes for a single frame, a horizontal synchronization signal (SHsync) for prescribing the time period for reading the detection result of the photodiodes for a single line, and a dot-clock signal (SDotclock) for prescribing the timing and other information for reading the image data for each pixel. The area image sensor 15 starts outputting data for a single frame according to the vertical synchronization signal SVsync and successively reads output data designed to show the detection results of the photodiodes that correspond to some of the pixels of the area image sensor 15 at timing that corresponds to the dot-clock signal SDotclock within the time period prescribed by the horizontal synchronization signal SHsync.

The ASIC 200 is provided with an image data generation section 20 composed of a circuit for performing a process whereby the image data for displaying an image of an object on the display 40 is generated by pipeline processing using line buffers 52a to 52d for a plurality of lines recorded the SD-RAM 52. The line buffers 52a to 52d for a plurality of lines can be established in the image data generation section 20 or the like. The display 40 displays the object on the liquid crystal panel 42 on the basis of the image data thus generated. In other words, the user can check the object using the display 40 as an EVF.

In addition, in a case in which the user operates the operating unit 55 and gives an instruction to capture an image, the area image sensor 15, following the instruction to capture an image, starts outputting output data for a single frame according to the vertical synchronization signal SVsync and successively reads the output data indicating the detection results of the photodiodes that correspond to all of the effective pixels of the area image sensor 15 at timing that corresponds to the dot-clock signal SDotclock within a time period prescribed by the horizontal synchronization signal SHsync. The image data generation section 20 generates image data in JPEG or another format using the SD-RAM 52 or the like, and records the data on a removable memory (not shown) or the like. In other words, the user can generate the image data that shows an object.

(2) Control of the Horizontal Synchronization Signal

Figure 2:
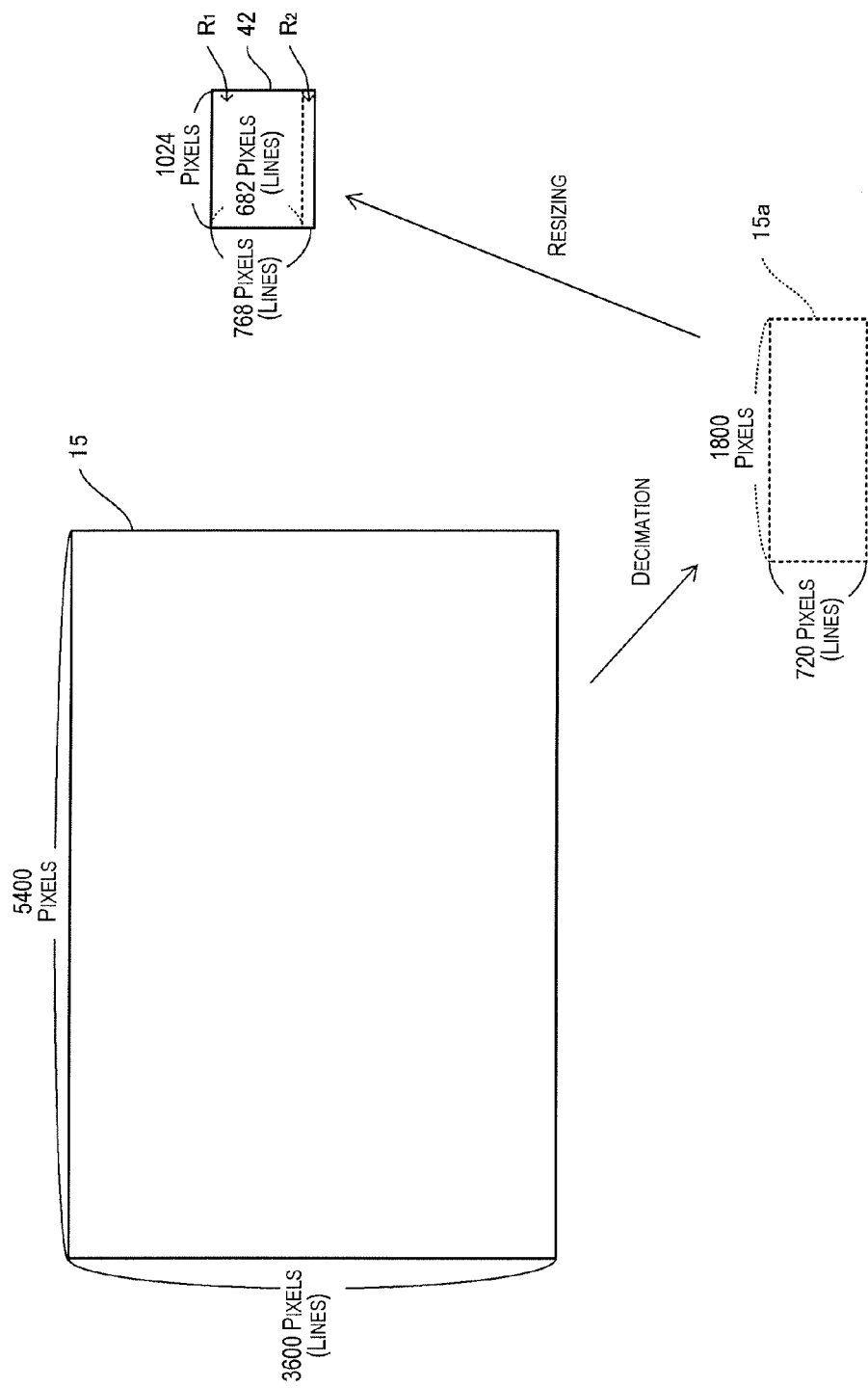
FIG. 2 is a view showing the number of elements of an area image sensor and a liquid crystal panel.

In a case in which recording of the image data that shows an object to a removable memory or the like, printing the data, and the like are taken into consideration, the number of pixels on the area image sensor 15 is preferably more than a certain number in order for high-quality image data to be obtained. In view of this, the number of effective pixels on the area image sensor 15 in the present embodiment is 5400 pixels in the horizontal direction and 3600 pixels in the vertical direction, as shown in FIG. 2. The area image sensor 15 is provided with a greater number of pixels than the effective pixels in the horizontal direction and vertical direction, but a description is given herein that, for simplicity, omits processes related to pixels other than effective pixels.

By contrast, the liquid crystal panel 42 is configured so that 1024 pixels are provided in the horizontal direction, and 768 pixels are provided in the vertical direction, and that an image of an object is displayed in an subject image display area (R1 in FIG. 2), as described previously. In the present embodiment, the subject image display area R1 for displaying an image of an object is a rectangular area whose upper side and left and right sides are adjacent to the upper side and left and right sides of the liquid crystal panel 42 and which has an aspect ratio of 2:3 in order to display as large an image as possible of an object while maintaining the aspect ratio (2:3) of the area image sensor 15. In addition, the remaining area is an information display area (the area shown in FIG. 2) for displaying characters that show the imaging conditions and other information. Consequently, the subject image display area R1 on the liquid crystal panel 42 is composed of 1024 pixels in the horizontal direction and 682 pixels in the vertical direction. As mentioned, the number of pixels of the area image sensor 15 and the number of pixels of the liquid crystal panel 42 do not match each other in the present embodiment.

Furthermore, the display on the display 40 is used by the user for checking an object. Therefore, the delay from the timing in which an object is captured by the area image sensor 15 to the timing in which the captured image of the object is displayed on the display 40 can be sufficiently long to be recognized by the user, whereupon a misalignment can occur between the image of an object sighted on the EVF and the image of an object being recorded, and an EVF that is very difficult to use can otherwise result. Consequently, the delay must be short when the display 40 is used as an EVF.

In view of this, various processes are performed by the area image sensor 15 and the image data generation section 20 in the present embodiment in order to display the image captured by the area image sensor 15 on the display 40 with an extremely small delay that is imperceptible to humans, and the display 40 is configured to be able to rapidly display the image data generated as a result of these processes.

In other words, the area sensor 15 pertaining to the present embodiment is provided with a circuit capable of executing interlaced scanning for reading the detection result of photodiodes at a ratio of one per n (where n is an odd number) from among the lines lined up in the vertical direction. The sensor is also provided with an adder for adding m detection results (where m is a natural number) lined up in the horizontal direction from among the photodiodes that perform photoelectric conversion via color filters of the same color, and outputting the sum as a 1/m-th fraction (in other words, the arithmetic mean of m detection results). The present embodiment is configured such that when the display 40 is made to function as an EVF, an object is captured rapidly by performing interlaced scanning and adder-based processing in the area image sensor 15, whereby the pixels are decimated in the horizontal direction and the vertical direction, and output data is output for a lower number of pixels than the number of pixels provided in the area image sensor 15.

Figure 3:
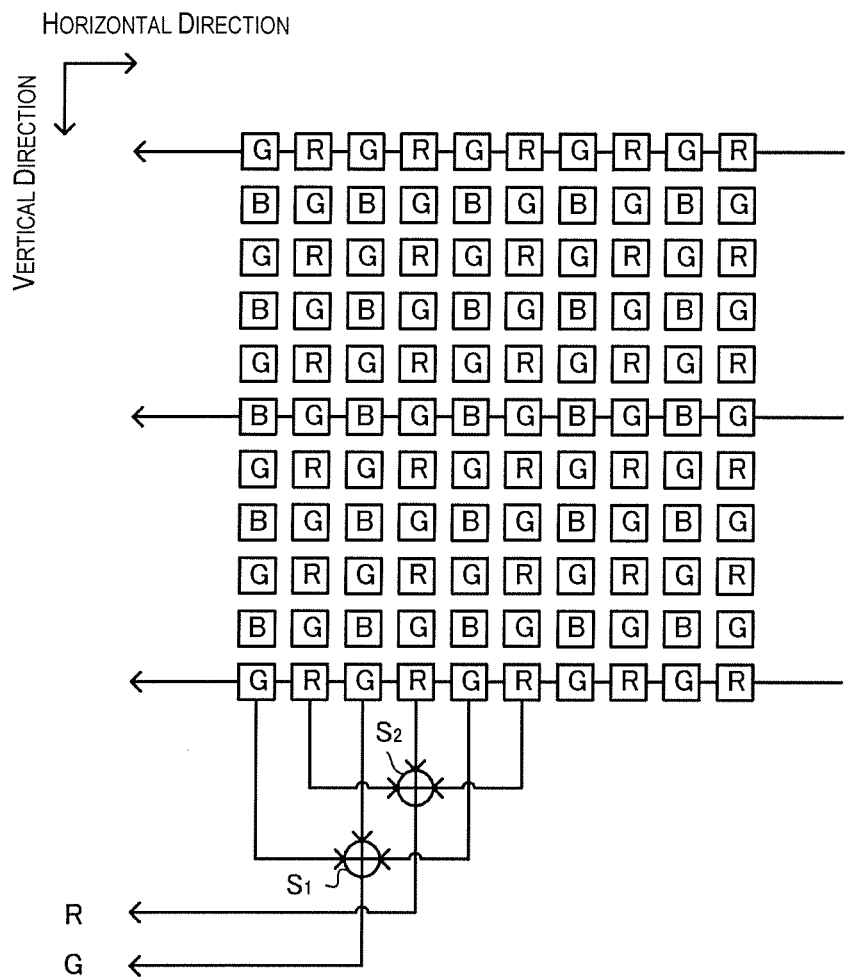
FIG. 3 is a view illustrating a method for outputting the output data of the area image sensor.

In other words, in live view mode, in which the display 40 is made to function as an EVF, the area image sensor 15 reads the vertical lines to be read at a rate of 1 per n in accordance with the horizontal synchronization signal SHsync. In addition, the results of adding the detection results of m photodiodes are output as output data according to the dot-clock signal SDotclock. FIG. 3 shows an example of a method for outputting output data of a lower number of pixels than the number of pixels provided in the area image sensor 15 in the present embodiment. In FIG. 3, a rectangle marked with R indicates a photodiode corresponding to a color filter for transmitting light in the red band, a rectangle marked with G indicates a photodiode corresponding to a color filter for transmitting light in the green band, and a rectangle marked with B indicates a photodiode corresponding to a color filter for transmitting light in the blue band.

As shown in FIG. 3, in a case in which the color filter for each pixel indicated by a rectangle is in a Bayer array, only a color filter for a single color corresponds to each pixel. Therefore, the color of each pixel requires interpolation using the surrounding pixels. Therefore, when a line is decimated and output data is received, decimation must be performed so that the color filters in the adjacent line after decimation are of a different color. Therefore, in the present embodiment, when the detection values from the photodiodes in each line are received as output data at a ratio of one line per n lines, where n is an odd number, it is possible to receive output data in which the color of each pixel is can be identified using interpolation. The present embodiment is configured so that, in order to approximate the number of lines in the vertical direction in the area image sensor 15 as closely as possible to the number of lines in the vertical direction in the subject image display area R1 of the liquid crystal panel 42, output data is received at a ratio of one line per every five lines. In FIG. 3, the reception of output data at a ratio of one line for every five lines is indicated by the arrows pointing left. In this example, the number of lines in the vertical direction is ⅕, or 720.

In a case in which the color filters are in a Bayer array, the colors of adjacent pixels in the horizontal direction are also different, and every other color filter in the line is of the same color. Therefore, every other pixel m in a line in the horizontal direction can be added up, and this sum can be used to perform substantial decimation at a ratio of 1/m (in other words, by determining the arithmetic mean of the detection results for m pixels). In the present embodiment, m is set at 3 due to quality constraints when the adding is performed by an adder. In the bottom line shown in FIG. 3, the detection results from three photodiodes lined up in the horizontal direction, which are photodiodes for performing photoelectric conversion via green color filters, are added up by an adder S1, and then reduced to ⅓. The detection results from three photodiodes lined up in the horizontal direction, which are photodiodes for performing photoelectric conversion via red color filters, are added up by an adder S2, and then reduced to ⅓. In this example, the number of pixels in the horizontal direction is ⅓, or 1800. In FIG. 2, the size of the decimated data in the area image sensor 15 is indicated by the dotted rectangle 15a.

As mentioned above, in the area image sensor 15, the number of lines in the vertical direction can be 720, and the number of pixels in the horizontal direction can be 1800. However, during such decimation, n is an odd number in the vertical direction, and m is a natural number in the horizontal direction. Because of this and other quality constraints, it is difficult to establish a match between the number of pixels after decimation and the number of pixels in the object display area R1 of the liquid crystal panel 42. Also, the aspect ratio is different between the object and the object image on the liquid crystal panel 42 in a case in which n and m are different from each other, as mentioned above.

In view of this, the present embodiment is configured so that, after being decimated, the output data is further resized in the image data generation section 20, and image data for displaying images in the subject image display area R1 of the liquid crystal panel 42 is generated. In other words, the image data generation section 20 is provided with a pixel interpolation section 20a, a color reproduction processing section 20b, a filter processing section 20c, a gamma correction unit 20d, and a resizing processing section 20e. The arrangement is such that the number of pixels in the vertical direction and the horizontal direction is changed by the resizing processing section 20e in the process of image data being generated, whereby image data is generated that is equal to the number of pixels in the subject image display area R1 of the liquid crystal panel 42.

The line buffer 52a is buffer memory for temporarily recording the output decimated data that has been output from the area image sensor 15. When the decimated output data is output from the area image sensor 15, the output data is temporarily recorded in the line buffer 52a by a process performed by the image data generation section 20. The pixel interpolation section 20a imports data having the number of pixels needed to generate the colors of the two missing channels for each pixel in the Bayer array from the line buffer 52a, and generates the colors for the two channels by interpolation while the data is imported. As a result, three-channel data is generated for each pixel. Next, the color reproduction processing section 20b reproduces the color for color matching by performing a 3×3 matrix operation on the basis of the data thus generated. The data generated by the color reproduction process is temporarily recorded in the line buffer 52b. Next, the filter processing section 20c adjusts the sharpness, removes noise, and the like by filtering. Next, the gamma correction section 20d performs gamma correction to compensate for the differences in characteristics between the color indicated by the tone value of the output data from the area image sensor 15 and the color indicated by the tone value of the image data handled by the display 40. The data generated by the gamma correction is recorded temporarily in the line buffer 52c.

The data being recorded as sequential lines in the line buffer 52c is the number of pixels decimated in the area image sensor 15. In other words, data for 720 lines is recorded as sequential lines in the vertical direction, and data for 1800 pixels is recorded as sequential lines in the horizontal direction. The resizing processing section 20e performs resizing by sequentially referencing the data to be recorded in the line buffer 52c, performing an interpolation calculation, and identifying the tone values for each channel in the positions between pixels. In the present embodiment, decimation is performed by the area image sensor 15 by ⅕ in the vertical direction, and by ⅓ in the horizontal direction. Therefore, the aspect ratio of the decimated data as indicated by the rectangle 15a in FIG. 2 is different from the aspect ratio of the output data in the area image sensor 15. In view of this, the resizing processing section 20e first reduces the data to a size of approximately 57% in the horizontal direction on the basis of data recorded in the line buffer 52c. As a result, the number of pixels in the horizontal direction is 1024. The resizing processing section 20e further reduces the data to approximately 95% in the vertical direction. As a result, image data having 1024 pixels in the horizontal direction and 682 lines in the vertical direction is generated. The image data thus generated is recorded as sequential lines in the line buffer 52d.

In the present embodiment, the process mentioned above generates image data that can be displayed in the subject image display area R1 of the liquid crystal panel 42 on the basis of the output data from the area image sensor 15, but the output data from the area image sensor 15 has 720 lines in the vertical direction. This differs from the 682 lines in the vertical direction in the image data, and the 768 lines in the vertical direction in the liquid crystal panel 42. In other words, the number of lines needed to capture and display a single frame is different.

In view of this, in the present embodiment, the frame start signal, horizontal synchronization signal SHsync, vertical synchronization signal SVsync, data active signal SDactive, and dot clock signal SDotclock for the area image sensor 15 are set in the cycle needed to drive the area image sensor 15. In other words, the timing generator 30 can perform such decimation in the vertical direction in the area image sensor 15, and can output the horizontal synchronization signal SHsync at the timing and output frequency that allow output data related to the number of lines in a single frame to be received within a period prescribed by the vertical synchronization signal SVsync. Also, the timing generator 30 performs such decimation in the horizontal direction and outputs the dot clock signal SDotclock at the timing and output frequency that allow output data related to the number of pixels in a single line to be received within a period prescribed by the horizontal synchronization signal SHsync.

An image data output section 201, VRAM 51, a timing information acquisition section 30a, and a display control section 30b are provided in order to display information on the liquid crystal panel 42 on the basis of the output data that is output as sequential lines from the area image sensor 15. In the present embodiment, the display control section 30b doubles as a determination unit for determining whether an overflow described below has occurred, but the controller can also be configured separately. The image data output section 201 outputs as sequential lines the image data (Data) recorded in the line buffer 52 to the VRAM 51. The image data output section 201 outputs a memory write end signal to the timing information acquisition section 30a at the point in time when the output of a single line of image data to the VRAM 51 has been completed.

When the timing information acquisition section 30a receives a memory write end signal, the display control section 30b outputs to the display 40 the horizontal synchronization signal DHsync for displaying the line corresponding to the memory write end signal. The liquid crystal panel driver 41 reads the image data in the line from the VRAM 51 and displays the data on the liquid crystal panel 42 in synchronization with the horizontal synchronization signal DHsync. In a specific example, the liquid crystal panel driver 41 references the output number of dot clocks DDotclock counted by the counter 41a, and forms a display for N pixels every time N dot clocks are output. Here, n is a natural number. As a result, an image of an object captured by the area image sensor 15 is displayed in the subject image display area R1 (lines 1 to 682 of the liquid crystal panel 42). Also, the CPU 50 records OSD data in the VRAM 51 at least before the information is displayed in the information display area R2. When information is to be displayed in lines 683 to 768 on the liquid crystal panel 42, the OSD data recorded in the VRAM 51 is read as Data in sequential lines from the liquid crystal panel driver 41. As a result, imaging conditions and other characters are displayed in the information display area R2.

In the subject image display area R1, the actual horizontal synchronization period TDH is made longer than the standard horizontal synchronization period TH in a case in which the output to the VRAM 51 is delayed because the image data generation section 20 proceeds slower than usual. Here, the standard horizontal synchronization period means the horizontal synchronization period as a standard that is set based on the vertical synchronization period and the number of lines per frame (including the number of lines that is output during the back porch period in the vertical direction, the number of lines for the liquid crystal panel 42, and the number of lines that is output during the front porch period in the vertical direction). This can be defined, for example, as the cycle of the vertical synchronization signal DVsync divided by the number of lines.

Figure 4A:
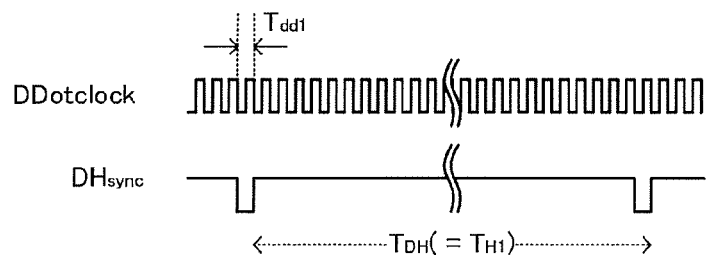
FIGS. 4A to 4D are timing charts for explaining an embodiment of the invention.
Figure 4B:
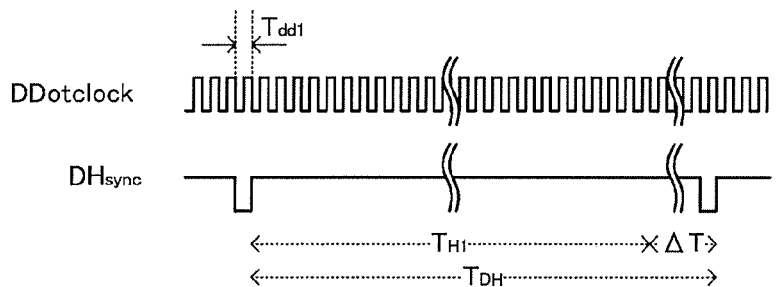

FIG. 4A shows the relationship between the dot clock DDotclock in cycle Tdd1 and the horizontal synchronization period TDH in a case in which the actual horizontal synchronization period TDH is not extended beyond the standard horizontal synchronization period TH1. FIG. 4B shows the relationship between the dot clock DDotclock in cycle Tdd1 and the horizontal synchronization period TDH in a case in which the actual horizontal synchronization period TDH is extended by ΔT beyond the standard horizontal synchronization period TH1. The output number of dot clocks DDotclock within the horizontal synchronization period TDH in the case of FIG. 4A is expressed as (TH1/Tdd1). The output number of dot clocks DDotclock within the horizontal synchronization period TDH in the case of FIG. 4B is expressed as {(TH1+ΔT)/Tdd1}. Therefore, the number of dot clocks DDotclock within the horizontal synchronization period TDH in a case in which the horizontal synchronization period TDH is extended beyond the standard horizontal synchronization period TH1 is increased in comparison with a case in which the horizontal synchronization period TDH is not extended beyond the standard horizontal synchronization period TH1.

The frame rate information acquisition section 30c is provided with a function for receiving information indicating the frame rate of the area image sensor 15 from the CPU 50. For example, in a case in which the user operates the operating section 55 and changes the frame rate of the area image sensor 15, the frame rate information acquisition section 30c can receive information indicating the frame rate after the change. Alternatively, the frame rate information acquisition section 30c can also receive information indicating the frame rate after the change in a case in which the imaging device 1 automatically changes the frame rate when the imaging environment changes from a bright environment to a dark environment.

In the present embodiment, the frame rate is set when live-view video is displayed on the liquid crystal panel 42 in accordance with the frame rate of the area image sensor 15. Therefore, in a case in which the frame rate of the area image sensor 15 is changed, the frame rate information acquisition section 30c receives information indicating the frame rate after the change, and the display control section 30b changes the cycle of the vertical synchronization signal DVsync and the cycle of the horizontal synchronization signal DHsync in accordance with the frame rate of the area image sensor 15. For example, the length of the standard horizontal synchronization period is extended in a case in which the frame rate for the area image sensor 15 is changed to a lower rate.

Figure 4C:
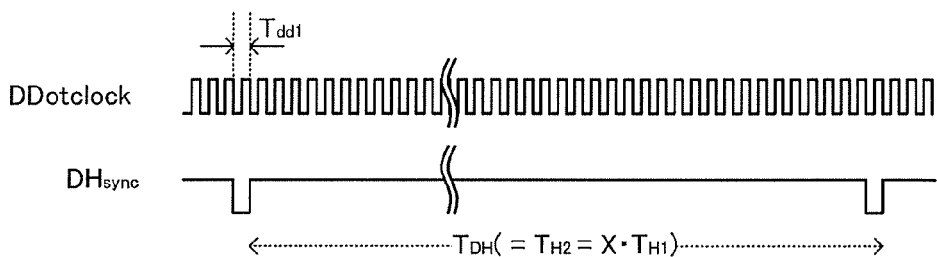

FIG. 4C shows an example in which the standard horizontal synchronization period TH2 is extended to X times the standard horizontal synchronization period TH1 in a case in which the frame rate of the area image sensor 15 has been switched to (1/X) times (where X>1) the frame rate in FIG. 4A. The output number of dot clocks DDotclock reaches (X·TH1/Tdd1) and increases beyond the case of FIG. 4A in a case in which the dot clock DDotclock is output in cycle (Tdd1), which is the same as in FIG. 4A, within the standard horizontal synchronization period TH2. The counter 41a invariably overflows any time the output number of dot clocks (X=TH1/Tdd1) exceeds the maximum value Cdd_MAX of the counter 41a in the display 40. (The present embodiment is premised on the fact that the actual horizontal synchronization period TDH cannot be made shorter than the standard synchronization period for the lines in the subject image display area R1.) In view of this, the display control section 30b prevents the counter 41a from overflowing by switching the cycle of the dot clocks DDotclock from the unchanged cycle Tdd1 (which corresponds to the first cycle) to cycle Tdd2 (which corresponds to the second cycle), which is longer than cycle Tdd1. More specifically, for example, the longest extendable horizontal synchronization period TDH_MAX is estimated, and cycle Tdd2 is set (it is apparent that Cdd_MAX>dMIN) so that the condition (TDH_MAX/Cdd_MAX)≤Tdd2≤(TDH_MAX/dMIN) is satisfied. Here, dMIN is the minimum number of dot clocks DDotclock to be generated in a single horizontal time period (it can, for example, be the sum of the minimum number of dot clocks DDotclock that are output during the back porch period in the horizontal direction, the minimum number of dot clocks DDotclock for displaying all of the pixels constituting a single line in the liquid crystal panel 42, and the minimum number of dot clocks DDotclock that are output during the front porch period in the horizontal direction). For example, the time from the start of image data generation for a single line by the image data generation section 20 to the output of the memory write end signal for the line is measured for the Cdd_MAX during the design phase of the timing generator 30. The longest horizontal synchronization period TDH_MAX that can be extended by the process performed in the image data generation section can be determined based on the time data for a statistically significant number of samples. The longest horizontal synchronization period TDH_MAX varies according to the frame rate.

Figure 4D:
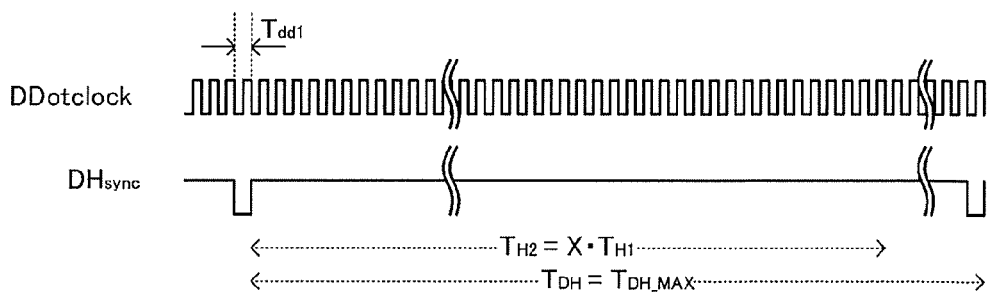

Even in a case in which the number of outputs (X·TH1/Tdd1) does not exceed the maximum value Cdd_MAX of the counter 41a, the number of outputs (TDH/Tdd1) is likely to exceed the maximum value Cdd_MAX in a case in which the actual horizontal synchronization period TDH is extended beyond the standard horizontal synchronization period TH2 (=X·TH1). FIG. 4D shows the horizontal synchronization period TDH in a case in which the frame rate of the area image sensor 15 is switched to (1/x) times the frame rate in FIG. 4A, that is, a case in which the actual horizontal synchronization period TDH is assumed to be extended to the estimated longest horizontal synchronization period TDH_MAX. (TDH_MAX/Tdd1) expresses the output number of dot clocks DDotclock in a case in which the dot clocks DDotclock are output in the unchanged cycle Tdd1 within the longest horizontal synchronization period TDH_MAX. In a case in which the output number of dot clocks (TDH_MAX/Tdd1) exceeds the maximum value Cdd_MAX, the display control section 30b assumes that an overflow is likely to occur and switches the cycle of the dot clocks DDotclock to cycle Tdd2. As a result, overflow of the counter 41 can be avoided. Cycle Tdd2 is set so as to satisfy the condition (TDH_MAX/Cdd_MAX)≤Tdd2≤(TDH_MAX/dMIN) in the same manner as described above.

Figure 5:
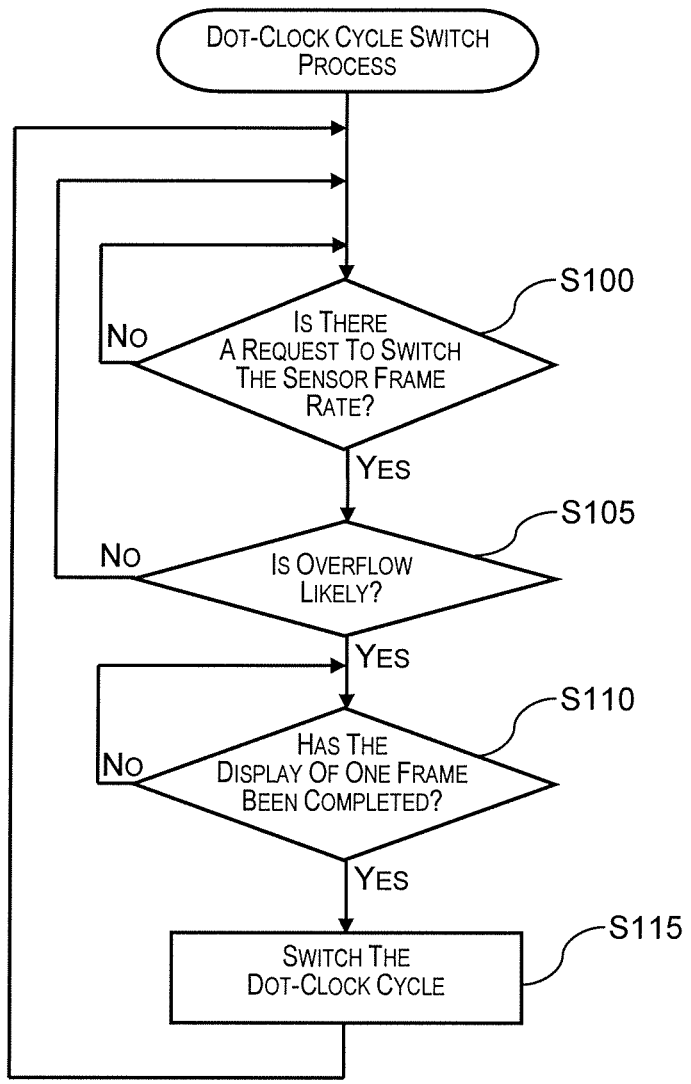
FIG. 5 is a flowchart showing a dot-clock switch process pertaining to an embodiment of the invention.
Figure 6:
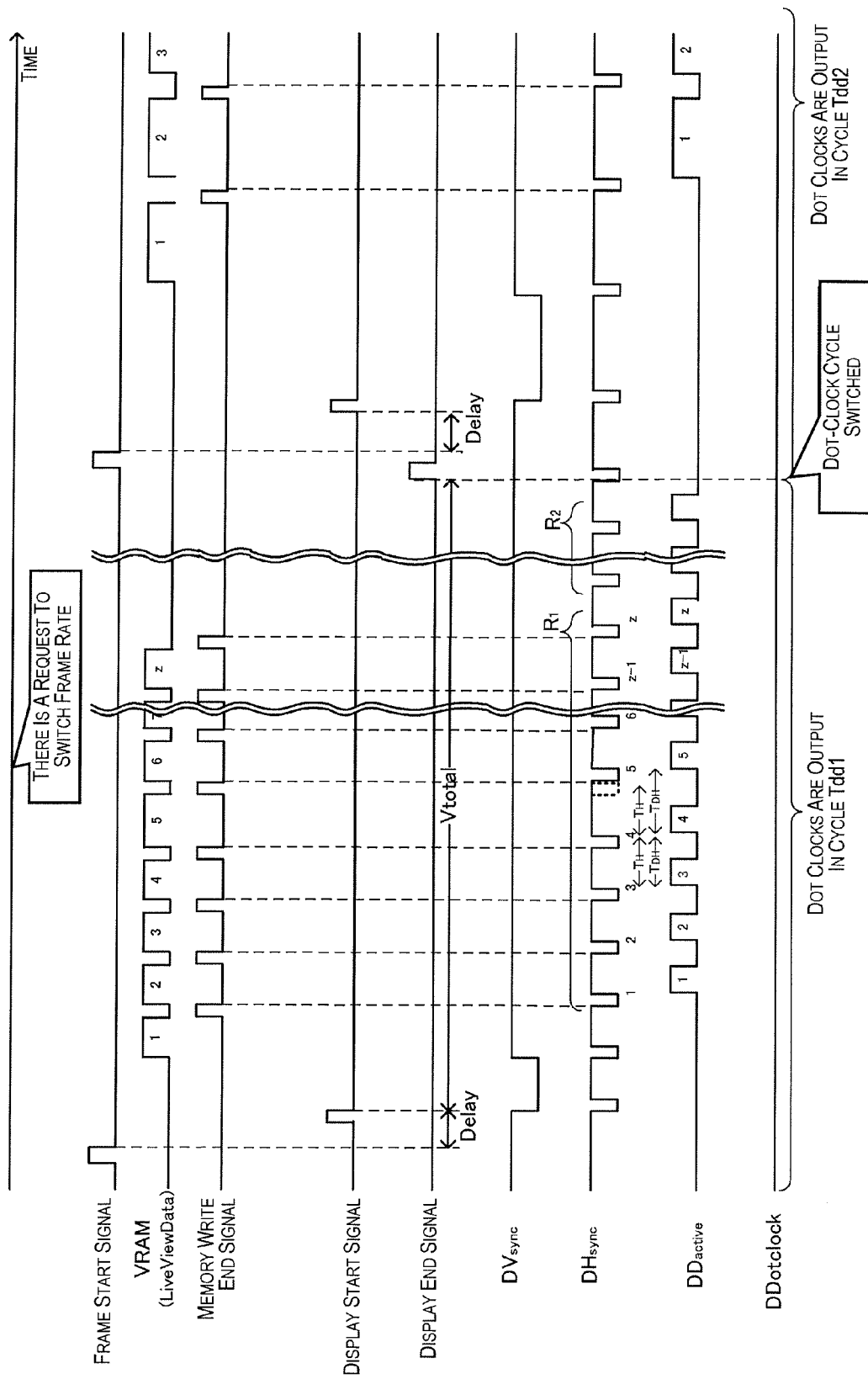
FIG. 6 is a timing chart pertaining to an embodiment of the invention.

FIG. 5 is a flowchart showing dot-clock switch timing, and FIG. 6 is a timing chart showing dot clock switching. In FIG. 6, "VRAM (Live View Data)" indicates the output timing of image data that is generated by the image data generation section 20 on the basis of output data from the area image sensor 15, and is output by the image data output section 201 to the VRAM 51 for each line. Signals having such a waveform are not generated in actual practice. The number indicates the line, the rising edge indicates the start of outputting image data for the line to the VRAM 51, and the trailing edge indicates the timing at the completion of the output. Also, the memory write end signal in the present embodiment is composed of a single pulse at which low-level output is maintained during the generation of a single line of image data, and at which high-level output is achieved for a predetermined period of time at the point in time when the generation of a single line of image data is ended and the data is output to the VRAM 51.

The frame rate information acquisition section 30c monitors the presence of a request to switch the frame rate of the area image sensor 15 (Step S100). When there is a request to switch the frame rate, the display control section 30b that doubles as a determination unit determines that an overflow is likely to occur, as mentioned above (Step S105). In other words, as explained using FIG. 4C, the display control section 30b determines whether the condition (X·TH1/Tdd1)>Cdd_MAX is satisfied. Also, as explained using FIG. 4D, the display control section 30b determines whether the condition (TDH_MAX/Tdd1)>Cdd_MAX is satisfied. The determination explained using FIG. 4D can be performed alone without performing the determination explained using FIG. 4C. In a case in which it is determined that an overflow is likely to occur, the display control section 30b stands by until the time that the display of a single frame is completed (Step S110), and switches the dot-clock cycle at the time that the display of a single frame is completed (Step S115). In the invention, the time that the display of a single frame is completed refers to the time after the display control section 30b outputs the display end signal shown in FIG. 6 to the display 40, and before the display start signal of the next frame is output.

The dot-clock cycle switching in Step S115 will now be explained. More specifically, in Step S115, the display control section 30b uses selector SEL in FIG. 8 to switch frequency dividers. It can be assumed, for example, that the frame rates of the area image sensor 15 in the imaging device 1 correspond to the three rates of 120 fps, 60 fps, and 30 fps. In this case, a dot-clock cycle (a cycle satisfying the condition (TDH_MAX/Cdd_MAX)≤Tdd2≤(TDH_MAX/dMIN)) at which the counter 41a will operate without overflowing, that is, a cycle at which dot clocks can be generated by dividing the clock signals of the clock signal generating means CLK, is calculated in advance during the design phase of the timing generator 30 for each one of the three types of frame rates. Frequency dividers DIV1-DIVn are designed as clock division circuits capable of generating the dot clocks for these cycles. As a result, a frequency divider is associated with each frame rate. For example, the frequency divider DIV1 is able to generate dot clocks at an overflow-free cycle in a case in which the frame rate is 120 fps, and the frequency divider DIV2 is able to generate dot clocks at an overflow-free cycle in a case in which the frame rate is 60 fps. Therefore, the display control section 30b uses a selector SEL to select the frequency divider corresponding to the switched frame rate in Step S115.

In a case in which the frame rate of the area image sensor 15 is thus switched in the present embodiment, it is determined whether the output number of dot clocks DDotclock that are output during a single horizontal synchronization period after the switch is likely to exceed the maximum value Cdd_MAX of the counter 41a after switching. The cycle of the dot clock DDotclock is made longer in a case in which the output number of dot clocks is likely to exceed the maximum value. As a result, an overflow of the counter 41a can be avoided.

On the other hand, the present embodiment is configured so that the horizontal synchronization period prescribed by the horizontal synchronization signal DHsync for the liquid crystal panel 42 has a variable length, as mentioned above. Therefore, the cycles for the vertical synchronization signals SVsync, DVsync remain the same and constant even when the horizontal synchronization period changes. As mentioned above, the horizontal synchronization period is likely to be longer than the standard horizontal synchronization period TH in the subject image display area R1. Therefore, time variations relative to the standard horizontal synchronization period TH can be canceled out by making the horizontal synchronization period in the information display area R2 shorter than the standard horizontal synchronization period TH, whereby the output signal is controlled so that the vertical synchronization period for displaying a single frame remains constant.

In other words, in the information display area R2 of the liquid crystal panel 42 where characters indicating imaging conditions and other information are displayed, the horizontal synchronization period is made shorter than the standard horizontal synchronization period TH so as to cancel out the cumulative difference between the standard horizontal synchronization period TH and the lengthened horizontal synchronization period in the subject image display area R1.

Figure 7:
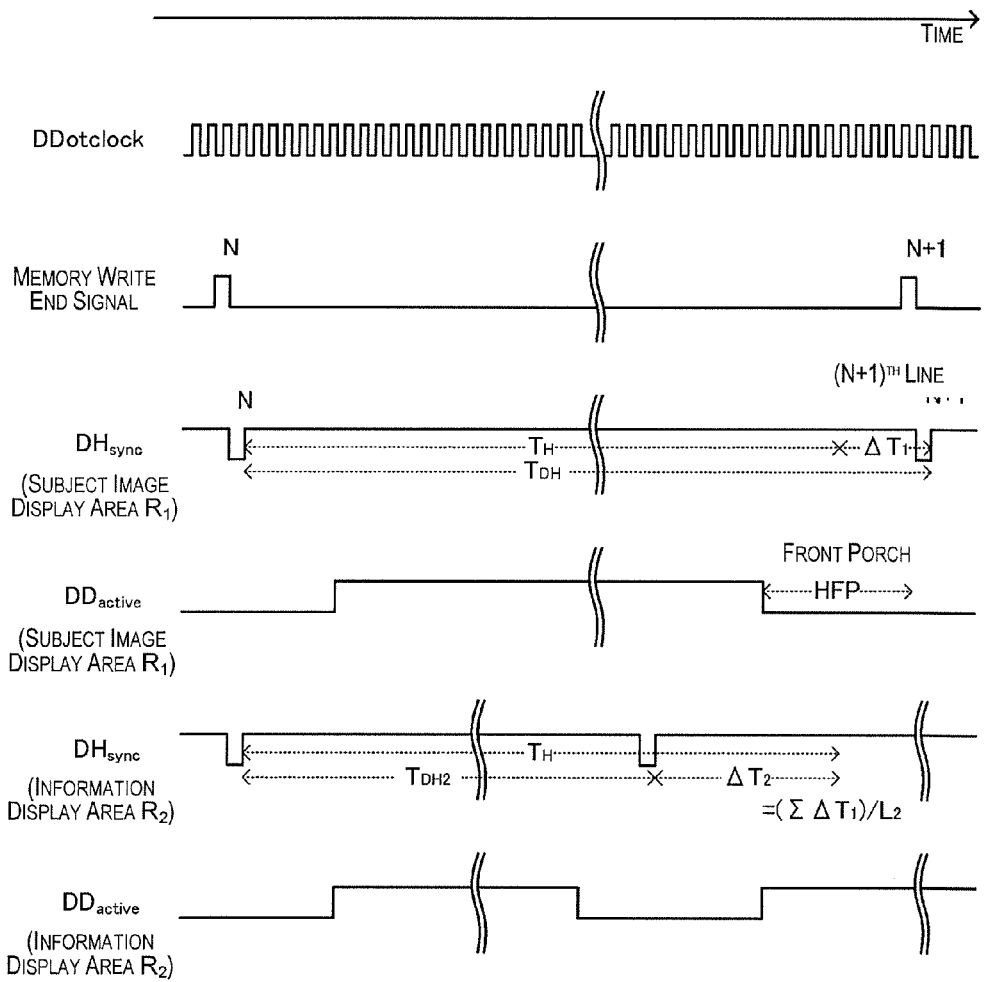
FIG. 7 is a timing chart pertaining to an embodiment of the invention.

FIG. 7 shows the horizontal synchronization signal DHsync that is output from a timing generator 30 thus configured, and shows in combined form the data active signal DDactive, dot clock signal DDotclock, and memory write end signal. When the timing generator 30 receives the memory write end signal via the timing information acquisition section 30a, the horizontal synchronization signal DHsync is output in synchronization with the memory write end signal by a process performed by the display control section 30b. Therefore, if there is not enough time to generate image data for a certain line within the standard synchronization period TH, the horizontal synchronization signal DHsync is not output until the generation process has ended, and the horizontal synchronization period TDH is made longer than the standard horizontal synchronization period TH. Therefore, in a case in which there is not enough time to generate image data for a certain line within the standard synchronization period TH, the display of the line on the liquid crystal panel 42 does not begin until the generation process has ended. Also, display does not occur until preparation of image data for each line has ended. In addition, the horizontal synchronization signal DHsync is output when the process of generating image data in N lines has ended and the output of data to VRAM 51 has been completed. Image data for N lines is therefore displayed without delay. In the present embodiment, the liquid crystal panel 42 is driven in a state in which the horizontal synchronization period TDH is longer than the standard horizontal synchronization period TH, as mentioned above. Therefore, the embodiment is preferably applied to a situation in which the time period for generating a single line of image data to be displayed on the liquid crystal panel 42 is changed for each line. Such a situation can be assumed to involve conditions under which there can be a line-by-line difference in speed between the output of data from the area image sensor 15 and the generation of image data by the image data generation section 20. It is apparent that the invention can also be applied to situations in which the processing speed is different for each line depending on the imaging conditions and the hardware used to capture images. For example, the invention can be applied to configurations in which the user varies the vertical synchronization period and the horizontal synchronization period of the area image sensor 15, or the period required to generate image data by operating the operating section 55. The invention can also be applied to configurations in which the vertical synchronization period and the horizontal synchronization period of the area image sensor 15, or the period required to generate image data is varied, by changing a detachable EVF or detachable lens.

In the present embodiment, the timing generator 30 adjusts the horizontal synchronization period TDH for the subject image display area R1 in response to the memory write end signal that is output from the image data output section 201, as mentioned above. The horizontal synchronization signal DHsync can therefore be made longer in response to progress in the generation of image data to be displayed in the object information display region R1, and the horizontal synchronization period TDH prescribed by the horizontal synchronization signal DHsync of the liquid crystal panel 42 is not necessarily constant. However, because the vertical synchronization period prescribed by the vertical synchronization signal DVsync is constant in the present embodiment, the timing generator 30 sets the output timing of the horizontal synchronization signal DHsync so that the horizontal synchronization period TDH2 is shorter than the aforementioned standard horizontal synchronization period TH in the information display area R2, as mentioned above. This ensures that the display of all lines on the liquid crystal panel 42 is ended within the vertical synchronization period even in cases in which the horizontal synchronization period TDH in the subject image display area R1 has been made longer.

In other words, data (called OSD data) for characters indicating the imaging conditions and other information can be created in advance without relying on the operation of the area image sensor 15, and recorded in the VRAM 51. Therefore, the appropriate display can occur without overtaking the data reading, even when display based on OSD data is performed using a short horizontal synchronization period. In view of this, the present embodiment uses settings under which the horizontal synchronization period of the information display area R2, in which characters are displayed indicating the imaging conditions and other information, is shorter than the horizontal synchronization period of the subject image display area R1, in which information is displayed based on the output data from the area image sensor 15.

More specifically, the horizontal synchronization period TDH2 is made shorter so as to establish a match between the sum total of the difference between the lengthened horizontal synchronization period TDH and the standard horizontal synchronization period TH for the subject image display area R1, and the sum total of the difference between the shortened horizontal synchronization period TDH2 and the standard horizontal synchronization period TH for the information display area R2 by causing the timing generator 30 to adjust the output timing of the horizontal synchronization signal DHsync. As a result, the condition "horizontal synchronization period TDH2"<"standard horizontal reference period TH"≤"horizontal synchronization period TDH" is established. Here, different types of configuration can be employed for outputting the horizontal synchronization signal DHsync so as to establish a horizontal synchronization period TDH2 that is shorter than the aforementioned standard horizontal synchronization period TH in the information display area R2. For example, a configuration can be employed in which a value $\Delta T2$, which represents the sum total ($\Sigma \Delta T1$) of the delays $\Delta T1$ in the standard horizontal synchronization period TH generated in the subject image display area R1 divided by the number of lines L2 in the information display area R2, is used for the period to be contracted in each line, as shown in FIG. 7. In other words, it is possible to employ a configuration such as one in which the standard horizontal synchronization period TH-$\Delta T2$ is the horizontal synchronization period TDH2 of the information display area R2.

In the present embodiment, information is appropriately displayed in each region on the basis of a horizontal synchronization signal adjusted for each region of the liquid crystal panel 42, as mentioned above. Therefore, the line numbers in the portions corresponding to the subject image display area R1 and the information display area R2 of the liquid crystal panel 42 are determined in advance. For example, in the example shown in FIG. 2, lines 1 to 682 represent the subject image display area R1, and lines 683 to 768 represent the information display area R2. In view of this, the horizontal synchronization signal DHsync is output at the timing that corresponds to the aforementioned memory write end signal when the timing generator 30 displays information in the subject image display area R1 that corresponds to lines 1 to 682. While this process is performed, the horizontal synchronization signal DHsync is output so that the horizontal synchronization period TDH2 is kept shorter than the aforementioned standard horizontal synchronization period TH when information is displayed in the information display area R2 that corresponds to lines 683 to 768.

According to this configuration, a state is established in which the imaging conditions and other information based on OSD data are displayed within a short horizontal synchronization period in the information display area R2 while an object captured by the area image sensor 15 in a state in which the delay is minimized is displayed in the subject image display area R1. As mentioned above, the horizontal synchronization period is controlled so as to establish a match between the sum total of the difference between the lengthened horizontal synchronization period TDH and the standard horizontal synchronization period TH in the object display area R1, and the sum total of the difference between the shortened horizontal synchronization period TDH2 and the standard horizontal synchronization period TH in the information display area R2. Information is therefore displayed on the display 40 in a state in which the cycles for the vertical synchronization signals SVsync, DVsync remain the same and constant. Therefore, an object captured with the area image sensor 15 is delayed by one or more frame periods and is not displayed on the liquid crystal panel 42, nor is the same image displayed on the liquid crystal panel 42 over a plurality of frame periods.

(3) Other Embodiments

The embodiment described above is an example in which the invention has been embodied. However, other types of embodiments can also be employed as long as the dot clocks are switched to a second cycle longer than the first cycle and are output in a case in which it is determined that the maximum value for the counter is likely to be exceeded by the output number of dot clocks in a case in which the dot clocks are output in the first cycle within the horizontal synchronization period. For example, the following modifications or combinations of these can be employed.

The present embodiment was explained with reference to an example in which the dot-clock cycle was changed in a case in which the frame rate of the area image sensor 15 was switched, but the cycle of the dot clock DDotclock can also be changed to a long cycle in the following cases. For example, a configuration can be used in which the display control section 30b is also provided with a counter for counting the output number of dot clocks DDotclock during each horizontal synchronization period. In this case, the maximum value of the counter provided to the display controller 30b is greater than the maximum value of the counter 41a provided to the display 40. The counter of the display control section 30b counts the output number of dot clocks DDotclock that are themselves output to the display 40 in the horizontal synchronization period. In a case in which the output number of dot clocks counted by the counter of the display control section 30b has exceeded a predetermined threshold thr1, the display control section 30b determines that the maximum value Cdd_MAX of the counter 14a of the display 40 is likely to be exceeded if the dot clocks continue to be output with the same cycle Tdd1 as before. In this case, the cycle of the dot clock DDotclock is switched from the unchanged cycle Tdd1 to cycle Tdd2, which is longer than Tdd1, and the dot clock DDotclock is output. In a specific example, the cycle is switched to one that satisfies the condition Tdd1≤Tdd2≤ (TDH_MAX/dMIN) and that can be generated by the frequency dividers shown in FIG. 8, and the dot clock DDotclock is output. TDH_MAX indicates the longest extendable horizontal synchronization period such as described above, and dMIN is the minimum value for the output number of dot clocks to be generated in a single horizontal time period.

The following is an explanation of the aforementioned predetermined threshold value thr1 with reference to FIG. 4B. For example, the threshold value thr1 is set as a value greater than the output number of dot clocks (TH1/Tdd1) that are output during the unchanged the cycle Tdd1 within the standard horizontal synchronization period TH1, and as a value smaller than the maximum value Cdd_MAX of the counter 41a. In other words, the threshold value thr1 is set so as to satisfy the condition (TH1/Tdd1)<thr1<Cdd_MAX. In this case, the dot-clock cycle can be extended in stages a plurality of times. Also, the dot-clock cycle can be switched at the timing at which the display of a single frame is completed. In other words, the dot-clock cycle can be switched after display of frame M (where M is a natural number) is completed but before display of frame M+1 is started when it is determined during the vertical synchronization period of frame M that the threshold value thr1 has been exceeded. Also, the dot clock DDotclock is not restricted to two-step switching. When the frame rate is reduced in three or more steps, the dot clock DDotclock also can be lengthened in three or more steps.

In the embodiment described above, there is a match between the cycle of the vertical synchronization signal SVsync for the area image sensor 15 and the cycle of the vertical synchronization signal DVsync for the liquid crystal panel 42. Therefore, the horizontal synchronization signal SHsync is output so as to establish a horizontal synchronization period that is shorter than the subject image display area R1 in the information display area R2 of the liquid crystal panel 42. It is also possible, however, to establish a match between the cycle of vertical synchronization signal SVsync and the cycle of the vertical synchronization signal DVsync for the liquid crystal panel 42 using other means. For example, in the typical imaging device, the horizontal synchronization signal DHsync for the liquid crystal panel 42 is shorter than the horizontal synchronization signal SHsync for the area image sensor 15 in a case in which it is assumed that the horizontal synchronization periods that are to be kept within a specific vertical synchronization period are equal to each other because there are more lines in the area image sensor 15 than there are in the liquid crystal panel 42. Therefore, even in cases in which the horizontal synchronization signal DHsync of the liquid crystal panel 42 is lengthened, it is rare that the vertical synchronization period of the liquid crystal panel 42 must be made greater by such lengthening. The vertical synchronization signal SVsync of the area image sensor 15 can be lengthened to synchronize the vertical synchronization signal DVsync and the vertical synchronization signal SVsync in cases in which the vertical synchronization signal DVsync for the liquid crystal panel 42 is made longer than the vertical synchronization signal SVsync for the area image sensor 15 by lengthening the horizontal synchronization signal DHsync.

It was also described in relation to the aforementioned embodiment that the dot clocks DDotclock are lengthened in a case in which the frame rate is reduced. Conversely, the dot clocks DDotclock are preferably shortened in a case in which the frame rate is increased. In this case, the dot clocks DDotclock are shortened at least to the extent that no overflow occurs. In the embodiment described above, the display 40 was an EVF using a liquid crystal panel, but the display 40 can be a display other than an EVF, such as a display using a liquid crystal panel attached to the back of the imaging device 1, or a display using a system other than a liquid crystal panel. Also, the imaging device 1 can be a single-lens reflex camera provided with a mirror, a movie camera, a mobile telephone provided with an imaging function, or another device. The color filter in the area image sensor 15 described above was a Bayer array, but the invention can be applied to an imaging device using a sensor arranged in an array other than a Bayer array. Furthermore, the line buffer 52d can be a line buffer for storing a single line of data, but can also be a line buffer for storing a plurality of lines of data, or a VRAM provided with memory capacity for recording a single frame of image data. Also, image data can be generated in single-line units or multiple-line units. In this configuration, various processes based on the image data to be displayed can be performed. Furthermore, the horizontal synchronization period can be lengthened with respect to the standard horizontal synchronization period, and various types of time period can be assumed to be able to serve as the standard horizontal synchronization period. For example, the cycle of the horizontal synchronization signal SHsync, the image data generation cycle, or the like of the area image sensor 15 can be used as the standard horizontal synchronization period. Furthermore, a variety of modes can be adopted as the mode of transmitting the various types of signals from the timing generator 30 to the display 40, and the transmission can be accomplished using HDMI (High-Definition Multimedia Interface) or the like. Also, the direction in the embodiment described above can be reversed, and display can be performed from left to right or from right to left in the horizontal direction, for example.

Furthermore, the OSD data can be image data in which predetermined information is indicated as an object to be displayed in the information display region of the display, and a configuration can be adopted in which the predetermined information as an object to be displayed indicates information other than the imaging conditions, such as information indicating the power level of the batteries installed in the imaging device 1, or the like. A configuration other than the one mentioned above can be used to keep the cycle of the vertical synchronization signals SVsync, DVsync the same and constant. It is possible, for example, to adopt a configuration in which information is displayed in the subject image display area R1, and the minimum settable time period is then set to the horizontal synchronization period in the information display area R2 in order to display OSD data in the information display area R2, whereby the display of all the lines on the liquid crystal panel 42 is ended before the output timing for the vertical synchronization signal DVsync, and the vertical synchronization signal DVsync is output according to the prescribed output timing after standby is maintained for the remaining time period. The entire disclosure of Japanese Patent Application No. 2010-230298, filed Oct. 13, 2010 is incorporated by reference herein.

What is claimed is:

1. A timing generator of an imaging device, comprising:
  a clock division circuit configured to output dot clocks in a first cycle to a display which includes a counter being configured to count the number of the dot clocks being output for a synchronization period which is a display cycle for a display line, the dot clocks corresponding to a synchronization signal being used when an image is displayed on the display; and
  a display control section configured to determine whether or not the number of the dot clocks in the synchronization period is expected to exceed a maximum value of the counter, length of the synchronization period being based on at least a frame rate of an image sensor configured to output image data indicating the image of an object,
  the display control section including a selector element being configured to switch from the first cycle to a second cycle which is longer than the first cycle, if the number of dot clocks in the synchronization period is expected to exceed the maximum value of the counter.

2. The timing generator according to claim 1, wherein
  if the frame rate is changed, the display control section is configured to determine whether the number of the dot clocks in the synchronization period is expected to exceed the maximum value of the counter after the frame rate is changed, and
  if the number of the dot clocks is expected to exceed the maximum value of the counter, the display control section is configured to output the dot clocks in the second cycle after being switched from the first cycle.

3. The timing generator according to claim 1, wherein
  if the number of the dot clocks is expected to exceed the maximum value of the counter, and if the frame rate is changed, the display control section is configured to determine the longest possible length of the synchronization period and to determine whether the number of the dot clocks the longest possible time of the synchronization period is expected to exceed the maximum value of the counter after the frame rate is changed, and
  if the number of the dot clocks is expected to exceed the maximum value of the counter, the display control section is configured to output the dot clocks in the second cycle after being switched from the first cycle.

4. The timing generator according to claim 1, wherein
  if the horizontal synchronization period is longer than a standard horizontal synchronization period which is defined on the basis of the frame rate, the display control section is configured to determine whether or not the number of the dot clocks in the synchronization period actually exceeds a predetermined threshold, and
  if the number of the dot clocks in the synchronization period actually exceeds the predetermined threshold, the display control section is configured to output the dot clocks in the second cycle after being switched from the first cycle.

5. The timing generator according to claim 4, wherein
  the predetermined threshold is greater than the number of dot clocks output in the first cycle within the standard horizontal synchronization period, and is lower than the maximum value of the counter.

6. The timing generator according to any of claim 1, wherein
  the display control section is configured to switch the first cycle to the second cycle, when the frame rate is switched.

7. An imaging device comprising:
  an image sensor configured to capture an image of an object at a prescribed frame rate and to output image data indicating the image;

a display configured to display the image based on the image data in synchronization with dot clocks, the display having a counter being configured to count the number of the dot clocks being output for a horizontal synchronization period, which is a display cycle for a display line, the dot clocks corresponding to a synchronization signal used when the image is displayed on the display;

a timing generator configured to output the dot clocks in a first cycle to the display, the dot clocks corresponding to a synchronization signal used when the image is displayed on the display; and a display control section configured to determine whether or not the number of the dot clocks in the synchronization period is expected to exceed a maximum value of the counter, length of the synchronization period being based on at least the frame rate of the image sensor, the display control section including a selector element being configured to switch from the first cycle to a second cycle, which is longer than the first cycle, if the number of dot clocks in the synchronization period is expected to exceed the maximum value of the counter.

8. A dot-clock output method of an imaging device, comprising:

receiving information indicating a frame rate of an image sensor for capturing an image of an object;

outputting dot clocks in a first cycle to a display which includes a counter being configured to count the number of the dot clocks being output for a synchronization period which is a display cycle for a display line, the dot clocks being a synchronization signal being used when the image is displayed on the display;

determining whether or not the number of the dot clocks in the synchronization period is expected to exceed a maximum value of the counter, length of the synchronization period being based on at least the frame rate of the image sensor; and switching from the first cycle to a second cycle, which is longer than the first cycle, if the number of dot clocks in the synchronization period is expected to exceed the maximum value of the counter.

* * * * *